United States Patent
Georgiev

(10) Patent No.: US 7,865,040 B1
(45) Date of Patent: Jan. 4, 2011

(54) USING NONLINEAR FILTERING WHILE RESIZING AN IMAGE TO PRESERVE SHARP IMAGE DETAIL

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 116 days.

(21) Appl. No.: 12/396,273

(22) Filed: Mar. 2, 2009

Related U.S. Application Data

(63) Continuation of application No. 11/256,734, filed on Oct. 24, 2005, now Pat. No. 7,519,235.

(51) Int. Cl.
G06K 9/32 (2006.01)
G06K 9/40 (2006.01)
(52) U.S. Cl. ...................... 382/298; 382/260
(58) Field of Classification Search ......... 382/298–300, 382/293, 260, 263, 276
See application file for complete search history.

(56) References Cited

U.S. PATENT DOCUMENTS

| | | | |
|---|---|---|---|
| 5,959,693 A | 9/1999 | Wu et al. |
| 5,977,947 A | 11/1999 | Potu |
| 6,052,130 A | 4/2000 | Bardon et al. |
| 6,229,521 B1 | 5/2001 | Yip |
| 6,310,601 B1 | 10/2001 | Moore et al. |
| 6,400,849 B1 | 6/2002 | Lee et al. |
| 6,404,934 B1 | 6/2002 | Lee et al. |
| 6,414,682 B1 | 7/2002 | Warren et al. |
| 6,445,832 B1 | 9/2002 | Lee et al. |
| 6,614,445 B1 | 9/2003 | Dorbie |
| 6,725,779 B2 | 4/2004 | Van de Velde et al. |
| 6,748,120 B1 | 6/2004 | Bradley |
| 6,760,486 B1 | 7/2004 | Chiao et al. |
| 6,816,622 B2 | 11/2004 | Blinn et al. |
| 6,928,196 B1 | 8/2005 | Bradley et al. |

(Continued)

OTHER PUBLICATIONS

"Bilateral Filtering for Gray and Color Images," by Tomasi, et al., Proceedings of the 1998 IEEE International Conference on Computer Vision, Bombay, India.

(Continued)

*Primary Examiner*—Yon Couso
(74) *Attorney, Agent, or Firm*—Robert C. Kowert; Meyertons, Hood, Kivlin, Kowert & Goetzel, P.C.

(57) ABSTRACT

One embodiment of the present invention provides a system that uses nonlinear filtering while resizing an image to preserve sharp detail. The system starts with an original image, which is a digital image comprised of a plurality of pixels. Next, the system resizes the original image. This involves first producing an initial resized image by using neighboring pixel values in the original image (or a conventional resizing operation) to produce initial values for subpixel locations in the original image. The system then applies a nonlinear filter using pixel values in the original and initial resized images to produce a resized output image. When this nonlinear filter updates pixel values, it weights the contributions of neighboring pixels nonlinearly. This non-linear weighting of neighboring pixels can be used to significantly reduce (or eliminate) the mixing pixel values from both sides of a sharp edge caused by conventional linear filters, and can thereby alleviate the problem of blurring sharp edges during image resizing operations.

15 Claims, 3 Drawing Sheets

U.S. PATENT DOCUMENTS 7,146,059 B1   12/2006   Durand et al.
2002/0159648 A1   10/2002   Alderson et al.
2006/0139376 A1   6/2006   Le Dinh et al.

OTHER PUBLICATIONS

"Fast Bilateral Filtering for the Display of HIgh-Dynamic-Range Images," by Durand and Dorsey; Laboratory for Computer science, Mass Institute of technology, SIGGRAPH 2002; pp. 257-266.

USING NONLINEAR FILTERING WHILE RESIZING AN IMAGE TO PRESERVE SHARP IMAGE DETAIL

The application is a continuation of U.S. application Ser. No. 11/256,734, which was filed on Oct. 24, 2005 now U.S. Pat. No. 7,519,235.

BACKGROUND

1. Field of the Invention

The present invention relates to computer-based tools for manipulating digital images. More specifically, the present invention relates to a method and an apparatus for resizing and image that uses nonlinear filtering to preserve sharp detail.

2. Related Art

In recent years, a number of techniques have been developed to resize digital images. These techniques typically use a "kernel filter" to generate pixel values for the resized image. For example, U.S. Pat. No. 6,816,622, entitled "Generating Resized Images Using Ripple-Free Image Filtering," describes such a system that uses linear kernel filters to generate resized images. (This patent is hereby incorporated by reference to describe general details of the kernel filtering process.)

To achieve high-quality resized images, people have focused on developing high-quality kernels. To this end, "Bilinear," "Bicubic" and "Sinc" kernels have been developed to perform image resizing operations. Theoretically, the best kernel is the "Sinc" kernel, but it is slow, so people use approximations, such as Bicubic, or other kernels. When speed is critical, people typically use Bilinear kernels.

With all of these kernels, edges become soft when an image is magnified. Images can subsequently be "sharpened" to improve edges, but sharpening an image brings out noise and produces ringing artifacts. The reason for the blurry edges in conventionally resized images is that the kernel used to generate the resized image mixes pixels from both sides of a sharp edge. For example, if pixels on one side of an edge are red, and pixels on the other side are blue, after the image is resized using a standard kernel, pixels in a region close to the middle of the new edge are somewhat purple. This is all due to the sampling kernel, since there is nothing purple in the original image.

If we make the kernel "infinitely small" to avoid this inappropriate mixing of red and blue, we get a one-pixel kernel, which produces a jagged-looking output that results from nearest-neighbor resampling. This is much worse than the result of a blurry resampling with a larger kernel.

It is possible to perform "sharpening" operations on a resized image to achieve better edges. However, doing so brings out noise and produces ringing artifacts. This noise can be avoided by detecting the edges and sharpening only the edges, or by using more sophisticated sharpening techniques. However, all of these approaches seek to fix damage that has already been caused by a flawed resizing operation, which blurs sharp edges.

Hence, what is needed is a method and an apparatus for resizing a digital image without the problems described above.

SUMMARY

One embodiment of the present invention provides a system that uses nonlinear filtering while resizing an image to preserve sharp detail. The system starts with an original image, which is a digital image comprised of a plurality of pixels. Next, the system resizes the original image. This involves first producing an initial resized image by using neighboring pixel values in the original image (or a conventional resizing operation) to produce initial values for subpixel locations in the original image. The system then applies a nonlinear filter using pixel values in the original and initial resized images to produce a resized output image. When this nonlinear filter updates pixel values, it weights the contributions of neighboring pixels nonlinearly. This non-linear weighting of neighboring pixels can be used to significantly reduce (or eliminate) the mixing pixel values from both sides of a sharp edge caused by conventional linear filters, and can thereby alleviate the problem of blurring sharp edges during image resizing operations.

In a variation on this embodiment, while updating a given pixel, the nonlinear filter weights the contribution of a neighboring pixel by a function of the difference between the neighboring pixel and the given pixel.

In a further variation, if the absolute value of the difference between the neighboring pixel and the given pixel is large, the nonlinear filter assigns a lower weight to the contribution of the neighboring pixel.

In a further variation, the nonlinear filter uses kernel values from a standard Bilinear kernel, Bicubic kernel or other approximations of the Sinc kernel, in which each kernel location is weighted by the function of the difference between the neighboring pixel and the given pixel.

In a further variation, the function of the difference between the neighboring pixel and the given pixel is a Gaussian function.

In a variation on this embodiment, the system applies the method iteratively by: using the resized output image as a higher-order initial resized image; and applying the nonlinear filter to the original image using this higher-order initial resized image to produce a next higher-order resized output image.

In a variation on this embodiment, producing an initial value for a given subpixel location in the initial resized image can involve: using the value of a nearest-neighboring pixel in the original image as the initial value for the given subpixel location; averaging values of neighboring pixels in the original image to produce the initial value for the given subpixel location; or performing a conventional resizing operation involving a standard Bilinear kernel, Bicubic kernel or Sinc kernel to produce the initial value for the given subpixel location.

One embodiment of the present invention provides an alternative system that uses nonlinear filter to resize an image. During operation, this alternative system obtains an original image and discretizes pixel values in this original image into a number of levels. For each level j, the system calculates a new image $I_j$, wherein each pixel value in $I_j$ is multiplied by a function of the difference between the pixel value in $I_j$ and j, wherein if the absolute value of the difference is small the function is close to 1, and if the absolute value of the difference is large the function is close to zero. Next, the system resizes each $I_j$ using a conventional resizing operation. The system also resizes an associated normalization image for each $I_j$ using a conventional resizing operation, wherein each pixel value in the normalization image is determined by the function of the difference between the corresponding pixel value in $I_j$ and j. The system then divides pixels in each resized image by corresponding pixels in the associated resized normalization image to produce a collection of normalized resized images. The system then produces a first estimate for a resized output image by performing a conventional resizing operation on the original image. Finally, the system generates a value for each pixel in the resized output image by identifying the two closest levels to a corresponding pixel value in the first estimate, and then interpolating between pixel values in the normalized resized images for the two closest levels.

DETAILED DESCRIPTION

Figure 1:
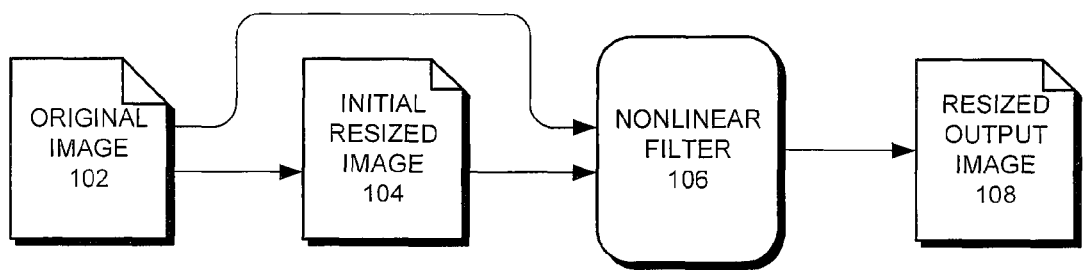
FIG. 1 illustrates the image-resizing process in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Basic Approach

One embodiment of the present invention resizes an image while faithfully preserving any sharp changes ("edge" sharpness) and details. In doing so, the present invention does not increase or decrease sharpness, and does not introducing ringing or warping artifacts around edges. Furthermore, the present invention, does not rely on edge detection, and works consistently over the whole image.

The present invention solves the above-described "color-mixing problem" by selectively mixing pixels in a nonlinear manner. Stated in a simplified way, if a pixel under the kernel is too different than the central pixel, we do not really use the pixel in the final mixture. In this way, we mix pixels, while excluding the bad ones that make edges blurry. Moreover, since we mix pixels appropriately; we preserve the smooth (as opposed to "jagged") look of the resized image, unlike nearest-neighbor interpolation.

More specifically, one embodiment of the' present invention uses a nonlinear "Bilateral sampling technique" while resizing an image. Note that Bilateral techniques have previously been used to remove noise (see [Tomasi] C. Tomasi and R. Manduchi, "Bilateral Filtering for Gray and Color Images," *Proceedings of the* 1998 *IEEE Intl. Conf. on Computer Vision*, Bombay, India).

In order to perform Bilateral sampling, for each output pixel, our technique needs the color of the input image at the corresponding subpixel location. Strictly speaking, this color only exists when the output image is the same size as the input image. But in the case of a resizing operation, this color value is what we are effectively trying to generate in the first place—a pixel value in a location between existing input pixels. We solve this chicken-and-egg problem by using traditional Bilinear interpolation to produce an input image value at that subpixel location. This initial step makes our definition of Bilateral resizing possible.

Figure 2:
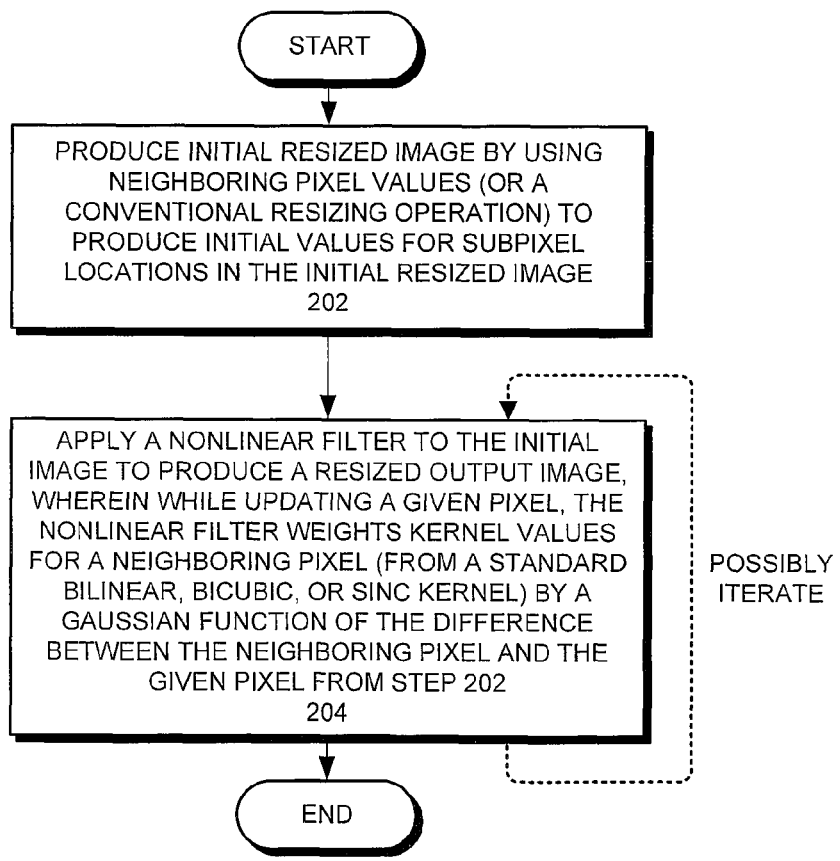
FIG. 2 presents a flow chart illustrating the operations involved in the image-resizing process in accordance with an embodiment of the present invention.

Hence, as is illustrated in the diagram in FIG. 1 (and the corresponding flow chart in FIG. 2), the present invention starts with an original image 102 and produces an initial resized image 104 (see step 202 in FIG. 2). As mentioned above, this can involve performing a traditional Bilinear interpolation operation to produce the initial resized image 104. Alternatively, the system can produce the initial resized image by using the value of a nearest-neighboring pixel in the original image as the value for a given subpixel location in the initial resized image 104. Or, the system can average values of neighboring pixels in the original image 102 to produce the initial value for the given subpixel location.

Next, the system applies a nonlinear filter 106 to the initial image (wherein the nonlinear filter uses initial resized image 104) to produce a final resized output image 108 (step 204 in FIG. 2). In one embodiment of the present invention, this nonlinear filter is implemented as a variation of a convention resizing technique. Conventional resizing techniques apply a sampling kernel to the input image to calculate a pixel value at every output pixel. This sampling process can be modified by multiplying each element of that kernel by a nonlinear function S(Fin−FU), wherein Fin is the interpolated input image color at the "central point" of the kernel, and wherein Fij is the value of input pixel (i,j), the one that is being used at this location of the kernel.

S( . . . ) can be any function, but a Gaussian is typical. S( . . . ) is close to 1 if Fin−Fij is small. However, S( . . . ) makes the contribution of pixel Fij insignificant if Fij is very different from Fin. Whether the color difference (Fin−Fij) is small or not is determined by the coefficient k in the Gaussian function, which is of the form $\exp(-kx^2)$.

Next, we let the normal sampling process take place. After summation, appropriate normalization is needed. (For example, this normalization can be performed as defined by equations (5) and (6) in [Tomasi].) Again, the interpolated color is used at the subpixel input location.

Using the above nonlinear-sampling technique, we calculate each pixel of the output image. Wherever changes are small (indicating that there are no edges), the value of S( . . . ) is approximately 1 and there is no difference in the result compared to the conventional approach. But when differences start to become significant, we begin to notice less dependence of the final result on pixels that sharply differ. Not only edges are preserved, but even a single bright pixel remains with its original color and doesn't get mixed with the surroundings.

Contrary to what might be expected from experiences with traditional Bilateral filters, there is no blurring whatsoever. This is because the underlying kernel is Bicubic or ideally— Sinc, which does not change the spectral distribution of band-limited images (as all real images are).

We can also iterate this technique (as is illustrated by the dashed line in FIG. 2). In doing so, we use the result of the above-described process as a "second-order" estimate of the input image color at each subpixel location, and we use this second-order estimate as input values of Fin. We then use the second-order estimate and sampling defined above to calculate a new output image, which is better quality than the second-order estimate. We can continue with higher orders, but the really big effect has already been achieved in the first resizing iteration.

Figure 4:
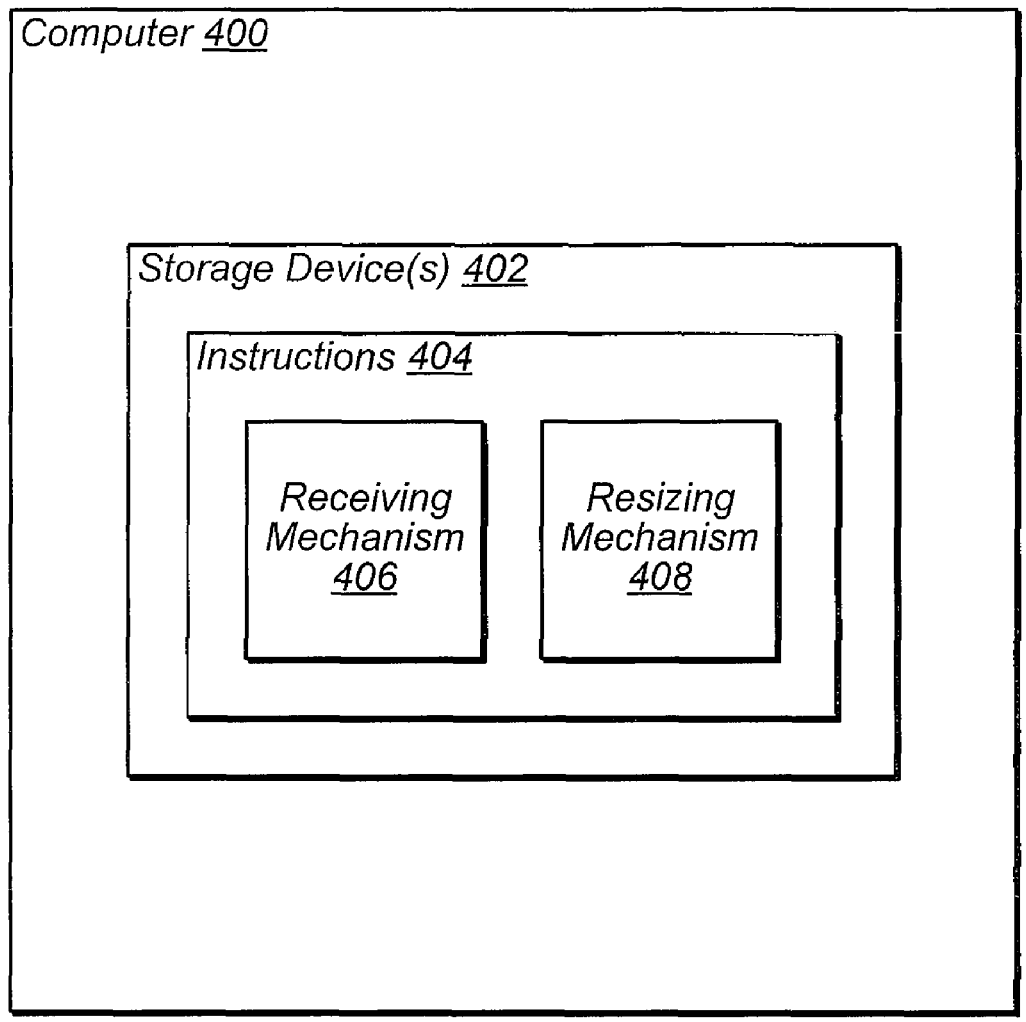
FIG. 4 illustrates a computer in accordance with one embodiment of the present invention.

In one embodiment, illustrated in FIG. 4, a computer 400 may include a computer-readable storage device 402 storing instructions 404 executable by the computer to resize an image using nonlinear filtering to preserve sharp detail. The instructions are further executable by the computer to implement a receiving mechanism 406 and a resizing mechanism 408. Receiving mechanism 406 may be configured to receive an original image, where the original image is a digital image which is comprised of a plurality of pixels. Resizing mechanism 408 may be configured to resize the original image, as described above. In particular, resizing mechanism 408 may be configured to produce an initial resized image by using neighboring pixel values in the original image to produce initial values for subpixel locations in the original image, and to apply a nonlinear filter using pixel values in both the original image and in the initial resized image to produce a resized output image, where the nonlinear filter weights the contributions of neighboring pixels nonlinearly while updating pixel values.

Alternative Image-Resizing Process

Figure 3:
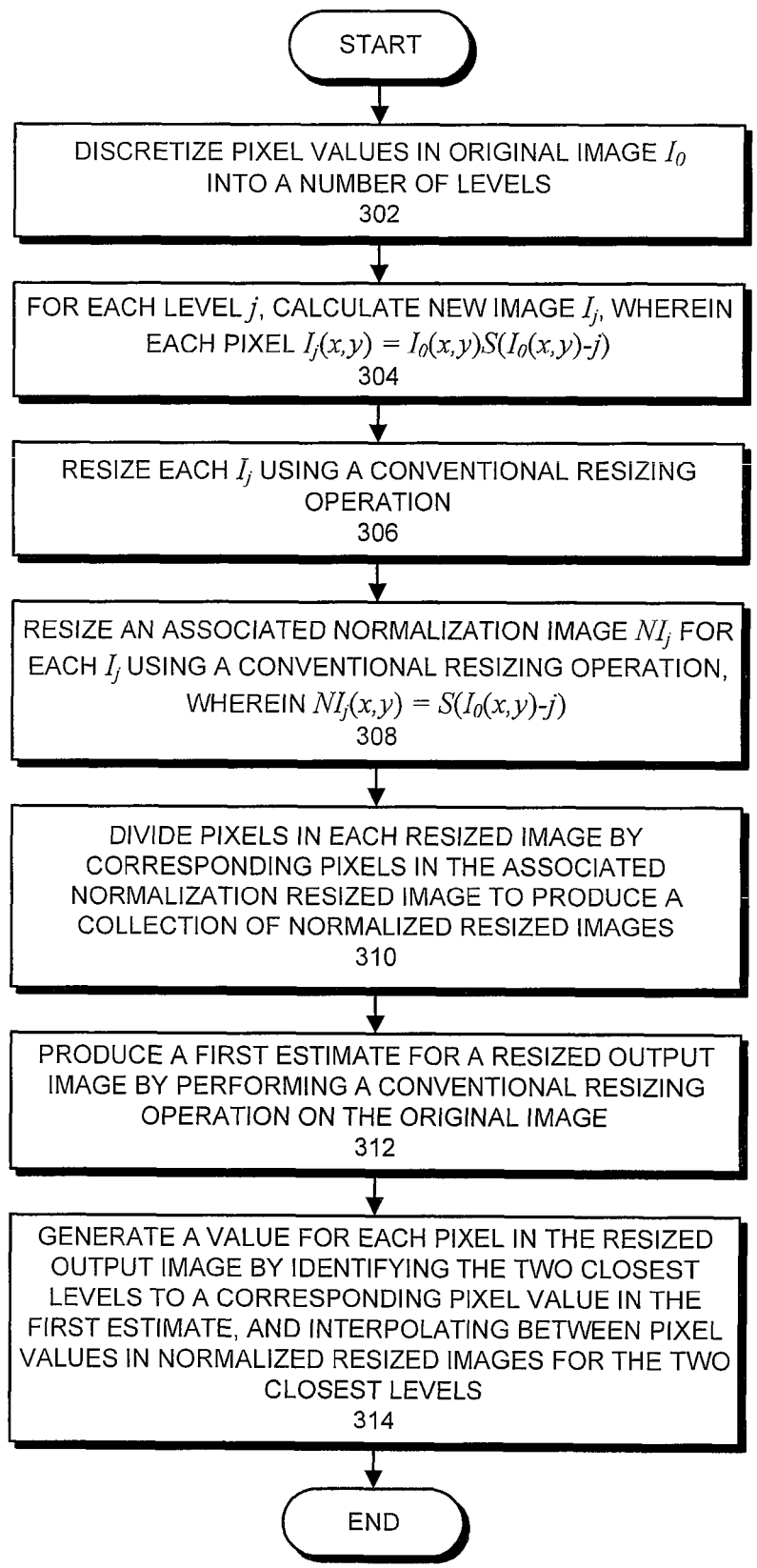
FIG. 3 presents a flow chart illustrating the operations involves the image-resizing process in accordance with another embodiment of the present invention.

FIG. 3 presents a flow chart illustrating the operations involved in an alternative image-resizing technique in accordance with an embodiment of the present invention. This alternative technique is faster, but produces a resized output image of slightly worse quality. This alternative technique is similar to a technique described in a paper entitled, "Fast Bilateral Filtering for the Dynamic Display of High-Dynamic-Range Images," by Fredo Durand and Julie Dorsey, *SIGGRAPH* 2002, pp. 257-266.

Referring to the flow chart illustrated in FIG. 3, this alternative technique first discretizes pixel values in the original image $I_O$. into a number of levels (step 302).

For each level j, the system calculates a new image $I_j$, wherein each pixel $I_j(x, y)=I_O(x, y)S(I_O(x, y)-j)$, wherein S is the (possibly Gaussian) function described above, $I_O(x, y)$ is a pixel in the original image $I_O$ at location (x, y), and j is the value of the current level (step 304).

The system then resizes each image 4 using a conventional resizing operation (step 306).

For each level j, the system also conventionally-resizes an associated "normalization image" $NI_j$, where each pixel $NI_j(x,y)$ in the normalization image NI has the value $S(I_O(x, y)-j)$ (step 308).

The system then divides pixels in each resized image by corresponding pixels in the associated resized normalization image to produce a collection of normalized resized images—one image for each level j (step 310).

Next, the system needs a first estimate of the resized image at each pixel. As in our previous technique, we can use a Bilinear (or Bicubic) resize of the original image for this first estimate (step 312).

To generate a pixel value in the final resized image, we conceptually pick that pixel from image $I_j$. However, since j is discretized, there is no exact j matching our first-order estimate, but we fall between two values. To get around this problem, for each pixel value in the first estimate, we select the two closest levels (values of j) to the pixel value, so that the pixel value from the first estimate falls between the values of j. We then interpolate linearly between pixel values in the normalized resized images associated with the two closest levels. This can be accomplished by calculating two coefficients a, b (such that a+b=1) with which we can linearly mix the values of j to produce the corresponding pixel value in the first estimate. Then use the same coefficients to combine the corresponding images $I_j$ (at that pixel) to produce the final resized image (step 314).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
resizing, by a computer, an original image, wherein the original image is a digital image comprising a plurality of pixels, and wherein said resizing comprises:
producing an initial resized image of the original image, wherein a value for each of a plurality of pixels of the initial resized image corresponding to a given subpixel location in the original image is determined using values for pixels in the original image that neighbor the given subpixel location;
applying a sampling kernel at each of the plurality of pixels of the initial resized image to calculate a new pixel value for each of the plurality of pixels of the initial resized image, wherein the sampling kernel comprises a plurality of elements, with one element corresponding to the central pixel for which the new pixel value is being calculated, and with each of the other elements corresponding to a pixel neighboring said central pixel, wherein said applying comprises:
modifying each element of the sampling kernel dependent upon a function of the difference between the initial resized image value of said central pixel and the initial resized image value of the pixel corresponding to said element of the sampling kernel, where the function is nonconstant and nonincreasing as the magnitude of the difference increases; and
using the modified values of the sampling kernel to calculate the new pixel value for said central pixel.

2. The computer-implemented method of claim 1, wherein the sampling kernel is a standard Bilinear kernel, Bicubic kernel or other approximation of a Sinc kernel.

3. The computer-implemented method of claim 1, wherein said function is a Gaussian function.

4. The computer-implemented method of claim 1, further comprising producing a higher-order resized image by applying the sampling kernel to an image derived by assigning said new pixel value to said each of the plurality of pixels of the initial resized image for which said new pixel value is calculated.

5. The computer-implemented method of claim 1, wherein the value of the initial resized image for each of the plurality of pixels of the initial resized image corresponding to a given subpixel location in the original image is determined based upon:
choosing an original-image pixel value of a nearest-neighboring pixel in the original image;
calculating an average of original-image pixel values of neighboring pixels in the original image; or performing a resizing operation on the original image using a standard Bilinear kernel, Bicubic kernel or Sinc kernel.

6. A computer-readable storage device storing instructions that when executed by a computer cause the computer to perform a method comprising:

resizing an original image, wherein the original image is a digital image comprising a plurality of pixels, and wherein said resizing comprises:

producing an initial resized image of the original image, wherein a value for each of a plurality of pixels of the initial resized image corresponding to a given sub-pixel location in the original image is determined using values for pixels in the original image that neighbor the given subpixel location;

applying a sampling kernel at each of the plurality of pixels of the initial resized image to calculate a new pixel value for each of the plurality of pixels of the initial resized image, wherein the sampling kernel comprises a plurality of elements, with one element corresponding to the central pixel for which the new pixel value is being calculated, and with each of the other elements corresponding to a pixel neighboring said central pixel, wherein said applying comprises:

modifying each element of the sampling kernel dependent upon a function of the difference between the initial resized image value of said central pixel and the initial resized image value of the pixel corresponding to said element of the sampling kernel, where the function is nonconstant and nonincreasing as the magnitude of the difference increases; and using the modified values of the sampling kernel to calculate the new pixel value for said central pixel.

7. The computer-readable storage device of claim 6, wherein the sampling kernel is a standard Bilinear kernel, Bicubic kernel or other approximation of a Sinc kernel.

8. The computer-readable storage device of claim 6, wherein said function is a Gaussian function.

9. The computer-readable storage device of claim 6, wherein the method further comprises producing a higher-order resized image by applying the sampling kernel to an image derived by assigning said new pixel value to said each of the plurality of pixels of the initial resized image for which said new pixel value is calculated.

10. The computer-readable storage device of claim 6, wherein the value of the initial resized image for each of the plurality of pixels of the initial resized image corresponding to a given subpixel location in the original image is determined based upon:

choosing an original-image pixel value of a nearest-neighboring pixel in the original image;

calculating an average of original-image pixel values of neighboring pixels in the original image; or performing a resizing operation on the original image using a standard Bilinear kernel, Bicubic kernel or Sinc kernel.

11. A computer, comprising:

a computer-readable storage device storing instructions executable by the computer, wherein the instructions are executable by the computer to implement resizing an original image, wherein the original image is a digital image comprising a plurality of pixels, and wherein said resizing comprises:

producing an initial resized image of the original image, wherein a value for each of a plurality of pixels of the initial resized image corresponding to a given sub-pixel location in the original image is determined using values for pixels in the original image that neighbor the given subpixel location;

applying a sampling kernel at each of the plurality of pixels of the initial resized image to calculate a new pixel value for each of the plurality of pixels of the initial resized image, wherein the sampling kernel comprises a plurality of elements, with one element corresponding to the central pixel for which the new pixel value is being calculated, and with each of the other elements corresponding to a pixel neighboring said central pixel, wherein said applying comprises:

modifying each element of the sampling kernel dependent upon a function of the difference between the initial resized image value of said central pixel and the initial resized image value of the pixel corresponding to said element of the sampling kernel, where the function is nonconstant and nonincreasing as the magnitude of the difference increases; and using the modified values of the sampling kernel to calculate the new pixel value for said central pixel.

12. The computer of claim 11, wherein the sampling kernel is a standard Bilinear kernel, Bicubic kernel or other approximation of a Sinc kernel.

13. The computer of claim 11, wherein said function is a Gaussian function.

14. The computer of claim 11, wherein the resizing produces a higher-order resized image by applying the sampling kernel to an image derived by assigning said new pixel value to said each of the plurality of pixels of the initial resized image for which said new pixel value is calculated.

15. The computer of claim 11, wherein the resizing determines the value of the initial resized image for each of the plurality of pixels of the initial resized image corresponding to a given subpixel location in the original image by:

choosing an original-image pixel value of a nearest-neighboring pixel in the original image;

calculating an average of original-image pixel values of neighboring pixels in the original image; or performing a resizing operation on the original image using a standard Bilinear kernel, Bicubic kernel or Sinc kernel.

* * * * *